US012699312B2

(12) United States Patent (10) Patent No.: US 12,699,312 B2
Yoshizawa et al. (45) Date of Patent: Aug. 4, 2026

(54) IMAGE EXPOSURE DEVICE, IMAGE EXPOSURE METHOD, AND PROGRAM

(71) Applicant: FUJIFILM Corporation, Tokyo (JP)

(72) Inventors: Hirotoshi Yoshizawa, Kanagawa (JP); Shinichiro Sonoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 197 days.

(21) Appl. No.: 18/165,294

(22) Filed: Feb. 6, 2023

(65) Prior Publication Data

US 2023/0185179 A1 Jun. 15, 2023

Related U.S. Application Data

(63) Continuation of application No. PCT/JP2021/027405, filed on Jul. 21, 2021.

(30) Foreign Application Priority Data

Aug. 25, 2020 (JP) ................................. 2020-142092

(51) Int. Cl.
*G03B 27/72* (2006.01)
*G03B 27/02* (2006.01)
(Continued)

(52) U.S. Cl.
CPC ........... *G03B 27/725* (2013.01); *G03B 27/02* (2013.01); *G06T 5/20* (2013.01); *G06T 5/75* (2024.01)

(58) Field of Classification Search
CPC .... G03B 27/725; G03B 27/02; G03B 27/522; H04N 1/4092; H04N 1/409; H04N 1/3224;
(Continued)

(56) References Cited

U.S. PATENT DOCUMENTS 4,709,274 A * 11/1987 Tanioka ................. H04N 1/403
358/2.1
5,016,040 A 5/1991 Dwyer, III
(Continued)

FOREIGN PATENT DOCUMENTS

CN 101394487 3/2009
CN 101933043 12/2010
(Continued)

OTHER PUBLICATIONS

Machine translation of WO-2019093027-A1 (Year: 2019).*
(Continued)

*Primary Examiner* — Steven H Whitesell
(74) *Attorney, Agent, or Firm* — JCIPRNET

(57) ABSTRACT

An image exposure device includes: an image display device that has a plurality of pixels and irradiates a photosensitive recording medium with light from the plurality of pixels; a support member that supports the photosensitive recording medium in a state in which an exposure surface of the photosensitive recording medium faces the image display device; a limiting member that is provided between the image display device and the support member and limits an angle of the light emitted from the image display device to the photosensitive recording medium; and a processor. The processor controls the image display device to display a display image generated by emphasizing only a dark portion among density differences of high-frequency components of an input image.

13 Claims, 10 Drawing Sheets

(51) Int. Cl.
    G06T 5/20         (2006.01)
    G06T 5/75         (2024.01)

(58) Field of Classification Search
    CPC ...... H04N 1/58; H04N 1/40062; H04N 1/405; G06T 2207/20192; G06T 5/75; G06T 5/20
    See application file for complete search history.

(56) References Cited

U.S. PATENT DOCUMENTS

| | | | |
|---|---|---|---|
| 8,896,625 | B2 | 11/2014 | Chen et al. |
| 9,826,884 | B2 | 11/2017 | Morita |
| 2002/0135788 | A1 | 9/2002 | Arakawa et al. |
| 2010/0329581 | A1* | 12/2010 | Yamazaki ................ H04N 1/58 382/254 |
| 2011/0085738 | A1* | 4/2011 | Kitamura .................. G06T 7/13 382/199 |
| 2020/0238684 | A1* | 7/2020 | Usami ..................... B41F 17/00 |
| 2020/0394768 | A1 | 12/2020 | Yoshizawa et al. |

FOREIGN PATENT DOCUMENTS

| | | | | |
|---|---|---|---|---|
| CN | 104883948 | | 9/2015 | |
| EP | 0813336 | | 12/1997 | |
| JP | S61-28278 A | * | 2/1986 | |
| JP | H1013680 | | 1/1998 | |
| JP | H11275365 | | 10/1999 | |
| JP | 2001160907 | | 6/2001 | |
| JP | 2002169233 | | 6/2002 | |
| JP | 2003037754 | | 2/2003 | |
| JP | 4577565 | | 11/2010 | |
| JP | 2015060294 | | 3/2015 | |
| WO | WO-2019093027 A1 | * | 5/2019 | .............. B41F 17/00 |
| WO | 2019187751 | | 10/2019 | |

OTHER PUBLICATIONS

Machine translation of JP S61-28278 A (Year: 1986).*
"International Search Report (Form PCT/ISA/210) of PCT/JP2021/027405", mailed on Sep. 21, 2021, with English translation thereof, pp. 1-6.
"Written Opinion of the International Searching Authourity (Form PCT/ISA/237) of PCT/JP2021/027405", mailed on Sep. 21, 2021, with English translation thereof, pp. 1-8.
"Search Report of Europe Counterpart Application", issued on Feb. 6, 2024, pp. 1-6.
Office Action of Japan Counterpart Application, with English translation thereof, issued on Sep. 12, 2023, pp. 1-6.
"Office Action of China Counterpart Application", issued on Apr. 25, 2025, with English translation thereof, p. 1-p. 23.
"Office Action of China Counterpart Application", issued on Sep. 5, 2025, with English translation thereof, p. 1-p. 25.
"Office Action of China Counterpart Application", issued on Dec. 2, 2025, with English translation thereof, pp. 1-25.
"Decision of Rejection of China Counterpart Application", issued on Feb. 11, 2026, with English translation thereof, p. 1-p. 29.

* cited by examiner

30

Q 32          30A          31

H          51

5          52 t1

Z

X

LIGHT
DIFFUSION

GRADATION VALUE          GRADATION VALUE

LIGHT DIFFUSION

E          E

X          X

DISPLAY IMAGE          RECORDED IMAGE

IMAGE PROCESSING
START

EXTRACT HIGH-FREQUENCY
COMPONENTS     ~S10

WEIGHT HIGH-FREQUENCY
COMPONENTS     ~S11

SUPERIMPOSE HIGH-FREQUENCY
COMPONENTS ON INPUT IMAGE     ~S12

END

DIFFERENCE VALUE

POSITIVE COMPONENT

×Wp(=0)

DIFFERENCE VALUE

WEIGHTING

0

0

NEGATIVE COMPONENT

×Wn(>0)

X

X

DIFFERENCE IMAGE

DIFFERENCE IMAGE
(AFTER WEIGHTING)

GRADATION VALUE

DIFFERENCE VALUE

0

X

X

INPUT IMAGE

DIFFERENCE IMAGE
(AFTER WEIGHTING)

ADDITION

⊕

GRADATION VALUE

GRADATION VALUE

DARK
PORTION

X

DISPLAY IMAGE

IMAGE EXPOSURE DEVICE, IMAGE EXPOSURE METHOD, AND PROGRAM

CROSS-REFERENCE TO RELATED APPLICATION

This application is a continuation application of International Application No. PCT/JP2021/027405, filed Jul. 21, 2021, the disclosure of which is incorporated herein by reference in its entirety. Further, this application claims priority from Japanese Patent Application No. 2020-142092 filed on Aug. 25, 2020, the disclosure of which is incorporated herein by reference in its entirety.

BACKGROUND

1. Technical Field

The technology of the present disclosure relates to an image exposure device, an image exposure method, and a program.

2. Description of the Related Art

An image exposure device that exposes a photosensitive recording medium (for example, an instant film) to light emitted from an image display device is known. A display image displayed on the image exposure device is recorded on the photosensitive recording medium. This image exposure device is used for an instant camera or the like.

Further, in order to suppress blurring of a recorded image recorded on a photosensitive recording medium, it is known to provide a limiting member between the image display device and the photosensitive recording medium to limit the angle of light emitted from the image display device to the photosensitive recording medium. The limiting member suppresses diffused light from the light emitted from the image display device to the photosensitive recording medium.

However, depending on the structure of the limiting member, the light emitted from the limiting member may be diffused. In this case, in the recorded image recorded on the photosensitive recording medium, the density difference in the edge portion (for example, the contour of the subject) becomes small, resulting in deterioration of visibility. That is, blurring occurs in the recorded image.

WO2019/187751A proposes emphasizing density differences of the high-frequency components of the display image in order to suppress the blurring of the recorded image caused by the diffusion of the light emitted from the limiting member.

SUMMARY

In the technology described in WO2019/187751A, in a case of emphasizing the density differences of high-frequency components of a display image, the bright portion and the dark portion are emphasized with the same weight. In a case where the density differences of the high-frequency components of the display image are emphasized in this way, the effect of suppressing the blurring of the recorded image can be obtained as compared with the case where the limiting member is simply provided.

In the case of using the technology described in WO2019/187751A, the brightness and darkness of the recorded image are emphasized by increasing the degree of emphasis of the density differences of the high-frequency components. However, the applicant has confirmed that, in a case where the degree of emphasis is increased above a certain level, the emphasized bright portion of the display image sometimes cancels the effect of emphasizing the brightness and darkness of the recorded image. Therefore, in a case where the degree of emphasis is increased above a certain level, the sense of resolution of the recorded image may not be improved.

An object of the technology of the present disclosure is to provide an image exposure device, an image exposure method, and a program that enable improvement in the sense of resolution of a recorded image.

In order to achieve the above object, according to an aspect of the present disclosure, there is provided an image exposure device comprising: an image display device that has a plurality of pixels and irradiates a photosensitive recording medium with light from the plurality of pixels; a support member that supports the photosensitive recording medium in a state in which an exposure surface of the photosensitive recording medium faces the image display device; a limiting member that is provided between the image display device and the support member and limits an angle of the light emitted from the image display device to the photosensitive recording medium; and a processor, in which the processor controls the image display device to display a display image generated by emphasizing only a dark portion among density differences of high-frequency components of an input image.

It is preferable that the processor generates the display image by emphasizing a bright portion in addition to the dark portion among the density differences of the high-frequency components of the input image, and a degree of emphasis of the dark portion is higher than a degree of emphasis of the bright portion.

It is preferable that the processor emphasizes the density differences of the high-frequency components extracted from the input image by unsharp mask processing.

It is preferable that, in a case where a resolution (unit: ppi) of the image display device is D, the processor sets a range for emphasizing the dark portion to a range according to a value M (unit: the number of pixels) obtained by a relational expression $M=30/(2.54 \times 1000/D)$.

It is preferable that the processor sets a standard deviation of a Gaussian filter to the value M or less, and extracts the high-frequency component by performing unsharp mask processing using the Gaussian filter from the input image.

It is preferable that the limiting member is an optical member of a diffusion optical system.

It is preferable that the optical member is a louver film in which first light transmission parts that transmit light and first light shielding parts that block light are alternately disposed in a first direction on a surface parallel to an arrangement surface where the pixels of the image display device are arranged, and second light transmission parts that transmit light and second light shielding parts that block light are alternately disposed in a second direction on the surface, the second direction being not parallel to the first direction.

It is preferable that the optical member is a louver film in which first light transmission parts that transmit light and first light shielding parts that block light are alternately disposed in a first direction on a surface parallel to an arrangement surface where the pixels of the image display device are arranged, and second light transmission parts that transmit light and second light shielding parts that block light are alternately disposed in a second direction on the surface, the second direction being perpendicular to the first direction.

It is preferable that the louver film is formed by laminating a first layer in which the first light transmission parts and the first light shielding parts are alternately disposed only in the first direction, and a second layer in which the second light transmission parts and the second light shielding parts are alternately disposed only in the second direction.

It is preferable that the louver film has a thickness of 2.0 mm or more and 4.0 mm or less, and an arrangement pitch of the first light shielding parts and the second light shielding parts is 80 μm or less.

It is preferable that the limiting member is disposed at a position separated by a certain distance from the photosensitive recording medium.

It is preferable that the certain distance is 0.67 mm or less.

According to another aspect of the present disclosure, there is provided an image exposure method in an image exposure device including an image display device that has a plurality of pixels and irradiates a photosensitive recording medium with light from the plurality of pixels, a support member that supports the photosensitive recording medium in a state in which an exposure surface of the photosensitive recording medium faces the image display device, and a limiting member that is provided between the image display device and the support member and limits an angle of the light emitted from the image display device to the photosensitive recording medium, the image exposure method comprising: controlling the image display device to display a display image generated by emphasizing only a dark portion among density differences of high-frequency components of an input image.

According to another aspect of the present disclosure, there is provided a program for causing a computer to execute a process, the computer controlling an image exposure device including an image display device that has a plurality of pixels and irradiates a photosensitive recording medium with light from the plurality of pixels, a support member that supports the photosensitive recording medium in a state in which an exposure surface of the photosensitive recording medium faces the image display device, and a limiting member that is provided between the image display device and the support member and limits an angle of the light emitted from the image display device to the photosensitive recording medium, the process comprising: controlling the image display device to display a display image generated by emphasizing only a dark portion among density differences of high-frequency components of an input image.

According to the technology of the present disclosure, it is possible to provide an image exposure device, an image exposure method, and a program that enable improvement in the sense of resolution of a recorded image.

BRIEF DESCRIPTION OF THE DRAWINGS

Exemplary embodiments according to the technique of the present disclosure will be described in detail based on the following figures, wherein.

DETAILED DESCRIPTION

Hereinafter, an image exposure device of the present embodiment will be described with reference to the drawings.

First Embodiment

Figure 1:
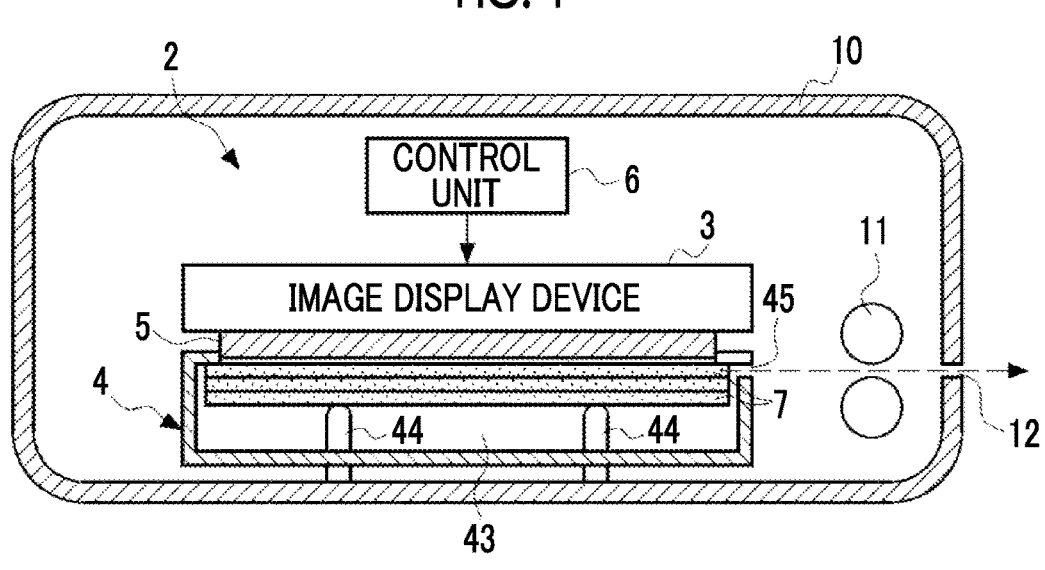
FIG. 1 is a schematic view of an image exposure device according to a first embodiment.
Figure 2:
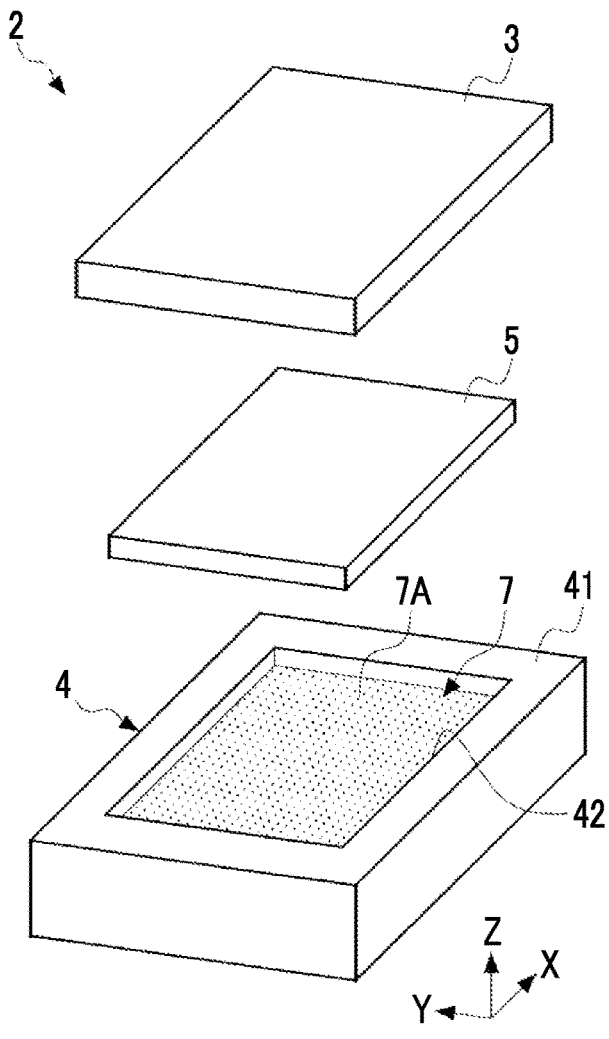
FIG. 2 is an exploded perspective view of the image exposure device according the first embodiment.
Figure 3:
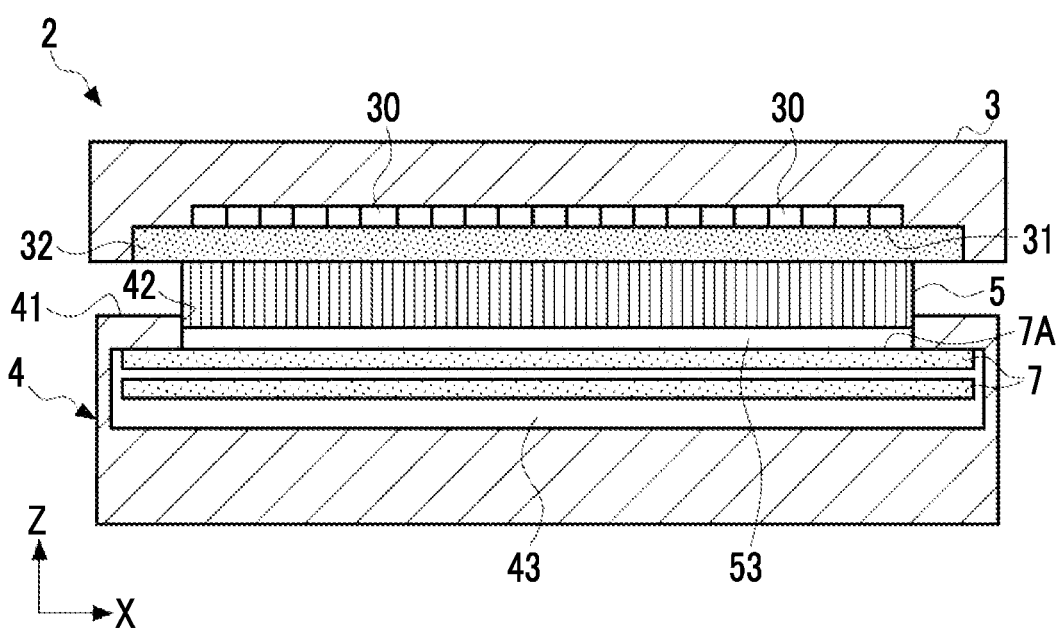
FIG. 3 is a cross-sectional view of the image exposure device according to the first embodiment.

First, a configuration of an image exposure device of a first embodiment will be described. FIG. 1 is a schematic view of the image exposure device according to the first embodiment. FIG. 2 is an exploded perspective view of the image exposure device according the first embodiment. FIG. 3 is a cross-sectional view of the image exposure device according to the first embodiment.

As shown in FIG. 1, an image exposure device 2 is housed in a body case 10 of, for example, an instant camera (for example, Instax (registered trademark) (trade name: Cheki) manufactured by Fujifilm Corporation).

The image exposure device 2 comprises an image display device 3, a support member 4, a limiting member 5 and a control unit 6. The image display device 3 has a plurality of pixels 30. The control unit 6 causes the image display device 3 to display an image based on the image data. The support member 4 supports a photosensitive recording medium 7 on which a recorded image corresponding to a display image displayed by the image display device 3 is recorded. The image data is acquired, for example, by an imaging element (not shown) provided in the body case 10.

The limiting member 5 is provided between the image display device 3 and the support member 4, and is an optical member for angle limiting that limits the angle of light emitted from the image display device 3 to the photosensitive recording medium 7. The limiting member 5 is, for example, a louver film.

(Image Display Device)

The image display device 3 is, for example, a liquid crystal display device (liquid crystal display (LCD)). Note that the image display device 3 is not limited to a liquid crystal display device, and may be a display device such as an organic EL display device (organic light-emitting diode (OLED)), a cathode ray tube display device (cathode ray tube (CRT)), or a light emitting diode display device (light-emitting diode (LED)).

In a case where a liquid crystal display device is used as the image display device 3, a light source such as a backlight is provided inside the body case 10. In a case where an organic EL display device is used as the image display device 3, the LED elements forming the pixels 30 emit light by themselves, and thus no light source is required.

As shown in FIG. 3, the image display device 3 has a plurality of pixels 30 for displaying display images. The pixel 30 is a minimum unit of color information forming an image display surface 31 of the image display device 3. The plurality of pixels 30 are arranged two-dimensionally on the image display surface 31. That is, the image display surface 31 is an arrangement surface on which the pixels 30 are arranged, and is parallel to an X direction and a Y direction shown in FIG. 2. The plurality of pixels 30 are arranged at a constant pitch in the X direction and the Y direction. Note that the X direction and the Y direction are orthogonal to each other. Moreover, in the following, the direction orthogonal to the X direction and the Y direction is called a Z direction.

By setting an arrangement pitch of the pixels 30 to 200 μm or less, the impression of the recorded image recorded on the photosensitive recording medium 7 as a natural image can be enhanced. Therefore, the arrangement pitch of the pixels 30 is preferably 150 μm or less, more preferably 125 μm or less, and even more preferably 85 μm or less.

In the present embodiment, as the image display device 3, for example, a liquid crystal display device with a resolution (pixel density) of 249 ppi (pixels per inch) is used. Since there are 249 pixels 30 per inch (2.54 cm) in a 249 ppi liquid crystal display device, the arrangement pitch of the pixels 30 is about 100 μm.

A glass window 32 for protecting the image display surface 31 is provided on the image display surface 31 side of the image display device 3. The thickness of the glass window 32 is preferably thin in order to shorten the distance from the image display surface 31 to the photosensitive recording medium 7.

(Support Member)

The support member 4 of the present embodiment supports the photosensitive recording medium 7 while facing the image display surface 31. The support member 4 may support the photosensitive recording medium 7 directly or indirectly. The structure of the support member 4 is not particularly limited as long as it can support the photosensitive recording medium 7.

In the present embodiment, the support member 4 is a case of a film pack accommodating a plurality of photosensitive recording media 7 inside. The support member 4 is a box-shaped case having a light-shielding property, and is provided with an exposure aperture 42 through which light emitted from the image display surface 31 of the image display device 3 passes through an upper surface 41 on the image display device 3 side. Inside the support member 4, an accommodating portion 43, which is a space for accommodating the plurality of photosensitive recording media 7, is provided.

The plurality of photosensitive recording media 7 are accommodated in the accommodating portion 43 in a laminated state. A light shielding sheet (not shown) is provided between the laminated photosensitive recording media 7. Only the uppermost photosensitive recording medium 7 among the plurality of laminated photosensitive recording media 7 is exposed by exposing an exposure surface 7A through the exposure aperture 42.

A pressing member 44 (see FIG. 1) is provided on the surface of the support member 4 opposite to the exposure aperture 42. The photosensitive recording medium 7 is urged toward the image display device 3 by the pressing member 44. Accordingly, the photosensitive recording medium 7 is pressed to abut against the periphery of the exposure aperture 42. As a result, the exposure surface 7A of the photosensitive recording medium 7 and the image display surface 31 are brought close to each other, and thus an image with good image quality is recorded on the photosensitive recording medium 7.

As a material for the support member 4, a resin member for a recording material that is used for various recording materials such as a photographic photosensitive material, a magnetic recording material, or an optical recording material can be used. The resin member for the recording material refers to a container, a lid, and an accessory supplemented thereto which are used to contain, pack, coat, protect, transport, or store the recording material, and support the form of the recording material or various members that mount the recording material and exhibit a function.

Further, the support member 4 is provided with an ejection port 45 for ejecting the exposed photosensitive recording medium 7 from the inside of the accommodating portion 43 to the outside of the accommodating portion 43. The exposed photosensitive recording medium 7 ejected from the ejection port 45 passes through between spreading rollers 11 (see FIG. 1), whereby a pod portion (not shown) provided in the photosensitive recording medium 7 breaks. A development treatment liquid is encompassed in the pod portion, and the breakage of the pod portion causes the development treatment liquid to spread in the photosensitive recording medium 7. After 1 to several minutes have passed, development treatment proceeds sufficiently. Accordingly, a recorded image is formed on the photosensitive recording medium 7.

The spreading rollers 11 are provided inside the body case 10. The body case 10 is provided with an ejection port 12 for ejecting the photosensitive recording medium 7 that has passed between the spreading rollers 11 to the outside of the body case 10.

(Photosensitive Recording Medium)

The photosensitive recording medium 7 is not particularly limited as long as it is a photosensitive recording medium capable of forming a recorded image with light emitted from the image display device 3. For example, as the photosensitive recording medium 7, an instant photographic film used in an instant camera (for example, Instax (registered trademark) (trade name: Cheki) manufactured by Fujifilm Corporation.) can be used. This instant photographic film incorporates a photosensitive recording medium 7 and a light shielding sheet.

Examples of a photosensitive material used for the photosensitive recording medium 7 include photographic photosensitive materials such as a negative film, a reversal film, printing paper, and a mono-sheet or peel-apart type instant photographic film.

(Limiting Member)

Figure 4:
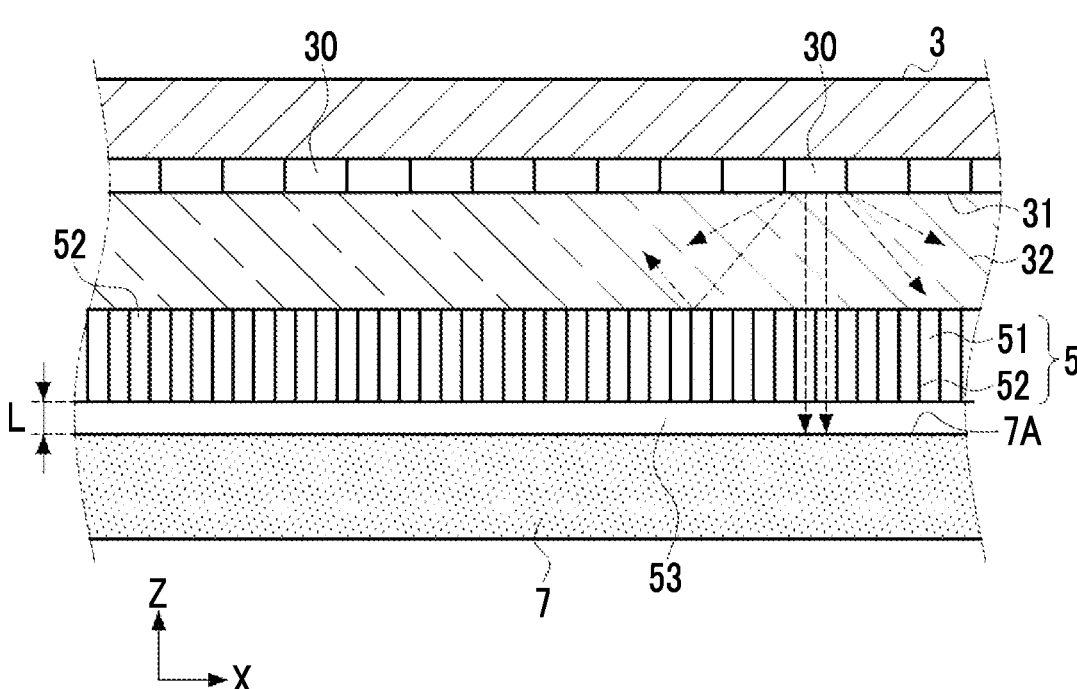
FIG. 4 is a view illustrating a traveling direction of light emitted from a pixel.
Figure 5A:
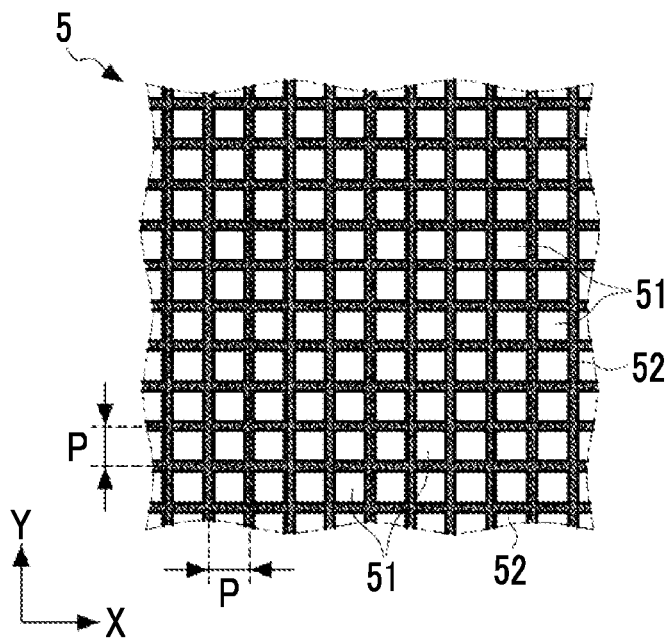
FIG. 5A is a plan view showing a configuration of a limiting member.
Figure 5B:
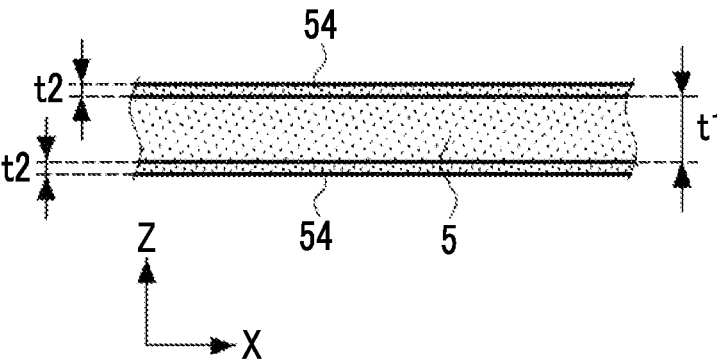
FIG. 5B is a side view showing the configuration of the limiting member.

An example of the limiting member 5 according to the present embodiment will be described with reference to FIGS. 4, 5A, and 5B. FIG. 4 is a schematic cross-sectional view of an example of the image exposure device 2, and illustrates a traveling direction of light emitted from the pixels 30. FIG. 5A is a plan view showing a configuration of the limiting member 5. FIG. 5B is a side view showing the configuration of the limiting member 5.

In the present embodiment, the limiting member 5 is composed of a louver film that transmits only light incident at a specific incidence angle. As shown in FIG. 5A, in the limiting member 5, light transmission parts 51 that transmit light and light shielding parts 52 that block light are alternately disposed in a first direction (corresponding to the X direction shown in FIG. 5A) on a plane parallel to the image display surface 31 of the image display device 3. The light transmission parts 51 and the light shielding parts 52 disposed in the first direction are examples of first light transmission parts and first light shielding parts according to the technology of the present disclosure.

In addition, in the limiting member 5, the light transmission parts 51 and the light shielding parts 52 are alternately disposed in a second direction (corresponding to the Y direction shown in FIG. 5A) perpendicular to the first direction and on the surface parallel to the image display surface 31 of the image display device 3. The light transmission parts 51 and the light shielding parts 52 disposed in the second direction of the present embodiment are examples of second light transmission parts and second light shielding parts according to the technology of the present disclosure.

In this way, in the present embodiment, the light transmission parts 51 are two-dimensionally disposed, and the light shielding parts 52 are formed in a lattice form. In the present embodiment, an arrangement pitch of the light shielding parts 52 in the X direction is equal to an arrangement pitch of the light shielding parts 52 in the Y direction. An arrangement pitch in the X direction and the Y direction is called a pitch P. The pitch P of the light shielding parts 52 is preferably 80 μm or less, and more preferably 65 μm or less. By setting the pitch P of the light shielding parts 52 within the above range, the obliquely emitted light among the light emitted from the pixels 30 can be effectively blocked.

For example, in a case where the pitch P is 60 μm, the width of the light transmission part 51 is set to 45 μm, and the width of the light shielding part 52 is set to 15 μm.

With configuring the limiting member 5 as described above, as shown in FIG. 4, the angle of light emitted from the pixels 30 of the image display device 3 to the exposure surface 7A of the photosensitive recording medium 7 can be limited.

As shown in FIG. 4, the light emitted from the pixels 30 of the image display device 3 is diffused light that propagates in all directions within a range of ±90° with respect to the Z direction. That is, the limiting member 5 is an optical member in the diffusion optical system.

Light emitted from the pixels 30 is incident on the limiting member 5 after passing through the glass window 32. Of the light incident on the limiting member 5, the light that is substantially parallel to the Z direction passes through the light transmission part 51 and is incident on the photosensitive recording medium 7. Further, of the light incident on the limiting member 5, the light traveling obliquely with respect to the Z direction is incident on the light shielding part 52 and is absorbed by the light shielding part 52. By limiting the angle of the light emitted from the image display device 3 to the photosensitive recording medium 7 in this way, the image quality of the recorded image recorded on the photosensitive recording medium 7 is improved.

The light transmission part 51 is made of, for example, a glass material or a light transmitting member such as transparent silicone rubber. The light transmission part 51 may be hollow as long as it can transmit light.

The light shielding part 52 is made of, for example, a light absorbing member that absorbs light. A colored resin material (for example, black silicone rubber) can be used as the light absorbing member. Moreover, a neutral density (ND) filter can be used as the light absorbing member. The ND filter means a filter having a neutral optical density, and is a filter that can evenly absorb light in a wavelength region used for exposure without giving an influence on the wavelength (absorbance of 50% or more to 99.999% or less or light transmittance of 0.001% or more to 50% or less). Note that the light shielding part 52 can also be made of a light reflecting member that reflects light.

A thickness t1 of the limiting member 5 shown in FIG. 5B is preferably 1.5 mm or more and 4.0 mm or less, more preferably 2.0 mm or more and 4.0 mm or less, and even more preferably 2.5 mm or more and 4.0 mm or less. By increasing the thickness t1 of the limiting member 5, it is possible to block oblique light that forms a small angle with respect to the Z direction. Here, in a case where the thickness t1 is too large, the recorded image tends to blur, and thus it is preferable to set the upper limit as described above.

In addition, in a case where the angles formed by the arrangement direction of the light transmission parts 51 and the light shielding parts 52 and the X direction and the Y direction, which are the arrangement directions of the pixels 30, are close to each other, moire fringes may occur in recorded image recorded on the photosensitive recording medium 7. In order to suppress the occurrence of this moire fringe, it is preferable that the angles formed by the arrangement direction of the light transmission parts 51 and the light shielding parts 52 and the X direction and the Y direction are preferably in the range of 1 to 45 degrees, and more preferably in the range of 5 to 40 degrees.

Further, in the present embodiment, the limiting member 5 is disposed at a position separated by a certain distance L from the exposure surface 7A of the photosensitive recording medium 7 (see FIG. 4). That is, a gap 53 is provided between the limiting member 5 and the exposure surface 7A of the photosensitive recording medium 7. Converting to the thickness of a glass substrate with a refractive index of 1.5, the certain distance L is preferably 1.50 mm or less, more preferably 1.00 mm or less, and even more preferably 0.50 mm or less. Converting to the thickness in the atmosphere with a refractive index of 1.0, the certain distance L is preferably 1.00 mm or less, more preferably 0.67 mm or less, and even more preferably 0.33 mm or less.

(Protective Layer)

As shown in FIG. 5B, a protective layer 54 may be formed on each of the upper surface which is a surface of the limiting member 5 on the image display device 3 side and the lower surface which is a surface of the photosensitive recording medium 7 side. The protective layer 54 prevents the limiting member 5 from being damaged by repeated exposure of the photosensitive recording medium 7.

The protective layer 54 is, for example, a plastic plate made of acrylic resin, polycarbonate, a vinyl chloride resin, or the like. The material of the protective layer 54 is not particularly limited as long as it is a layer having translucency.

A thickness t2 of the protective layer 54 is preferably 0.1 µm or more and 500 µm or less. By setting t2≥0.1 µm, in addition to the effect of protecting the limiting member 5, the effect of making moire fringes inconspicuous is also obtained. Further, by setting t2≥0.1 µm, the effect of making image defects caused by defects or structures of the limiting member 5 inconspicuous is obtained. Further, by setting t2≤500 µm, blurring of the recorded image can be suppressed.

The thickness of the protective layer 54 on the upper surface side of the limiting member 5 and the thickness of the protective layer 54 on the lower surface side of the limiting member 5 may be different. Moreover, the protective layer 54 may be provided only on the lower surface side of the limiting member 5. Furthermore, providing the protective layer 54 on the limiting member 5 is not essential, and the limiting member 5 may not be provided with the protective layer 54.

Next, light emitted from the pixels 30 of the image display device 3 will be described. As described above, the limiting member 5 limits the angle of the light emitted from the image display device 3 to the photosensitive recording medium 7, so that light substantially parallel to the Z direction passes through the light transmission part 51 of the limiting member 5.

Figures 6, 7:
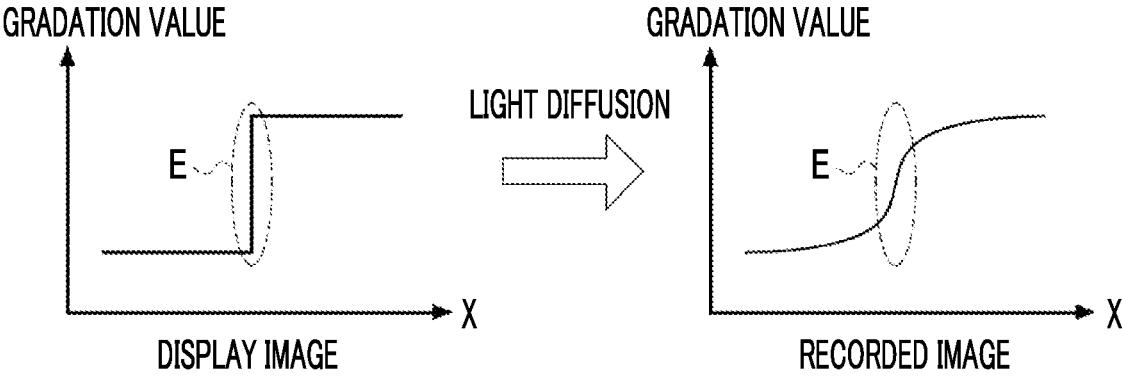
FIG. 6 is a view illustrating diffusion of light that has passed through the limiting member.
FIG. 7 is a view illustrating blurring that occurs in a recorded image due to light diffusion.

However, since the pixel 30 can be considered as an aggregate of point light sources, the light emitted from point light sources 30A is diffused as shown in FIG. 6. Specifically, a light component having a certain angle according to a height H of the light shielding part 52 from the image display surface 31 and a width Q of the light transmission part 51 passes through the light transmission part 51 and diffuses. Due to the diffused light component, as shown in FIG. 7, in the recorded image recorded on the photosensitive recording medium 7, a density difference of a high-frequency component (edge portion) E is reduced as compared with the display image. That is, in the recorded image, since the density difference is small, the edge portion tends to be difficult to be visually recognized. As a result, the recorded image is more likely to be blurred.

As a thickness t1 of the limiting member 5 increases, the amount of light reaching the photosensitive recording medium 7 from the image display device 3 decreases, so that there is a problem that a very long exposure time is required. Further, as a thickness t2 of the protective layer 54 increases, the distance L between the image display surface 31 and the exposure surface 7A of the photosensitive recording medium 7 increases, and the angle of light is not limited in the protective layer 54, and thus blurring of the recorded image is likely to occur.

Since it is difficult to completely suppress blurring of the recorded image due to the diffused light by the limiting member 5 in this way, the control unit 6 performs emphasis processing for increasing the density difference of the high-frequency component (edge portion) in the display image displayed on the image display device 3. By exposing the photosensitive recording medium 7 to light based on the display image in which the density difference of the high-frequency component is emphasized, blurring of the recorded image recorded on the photosensitive recording medium 7 is consequently suppressed.

Figures 8, 9:
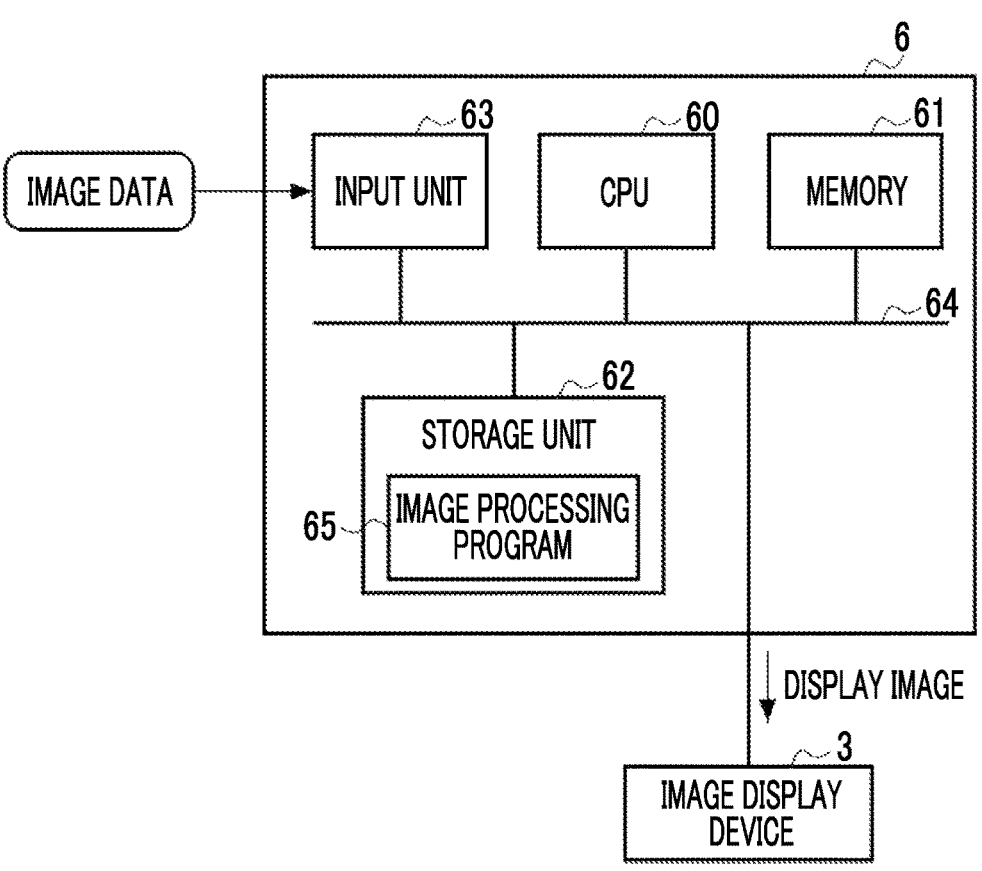
FIG. 8 is a block diagram showing an example of a hardware configuration of a control unit.
FIG. 9 is a flowchart showing an example of image processing executed by the control unit.

FIG. 8 shows an example of the hardware configuration of the control unit 6. The control unit 6 is composed of a computer including a central processing unit (CPU) 60, a memory 61 as a temporary storage area, and a non-volatile storage unit 62. The control unit 6 also includes an input unit 63. The CPU 60, the memory 61, the storage unit 62, and the input unit 63 are connected to each other via a bus 64.

The storage unit 62 is realized by a hard disk drive (HDD), a solid state drive (SSD), a flash memory, or the like. An image processing program 65 is stored in the storage unit 62. The CPU 60 reads the image processing program 65 from the storage unit 62, loads the read image processing program 65 in the memory 61, and then executes the image processing program 65. The CPU 60 functions as the control unit 6 by executing processing based on the image processing program 65. The CPU 60 is an example of a processor according to the technology of the present disclosure.

Image data corresponding to the display image displayed on the image display device 3 is input to the input unit 63. Note that the image data may be acquired by an imaging element in the image exposure device 2 or may be input from outside the image exposure device 2. An image represented by image data input to the input unit 63 is hereinafter referred to as an input image.

The control unit 6 causes the image display device 3 to display a display image obtained by performing the emphasis processing on the input image. Further, the control unit 6 controls the image display device 3 to display a display image in which the image quality of the input image is degraded by emphasizing the density difference of the high-frequency component of the input image.

FIG. 9 shows an example of image processing executed by the control unit 6. The image processing shown in FIG. 9 is executed by the CPU 60 executing processing based on the image processing program 65.

In Step S10, the control unit 6 performs high-frequency component extraction processing for extracting high-frequency components from the input image. In the present embodiment, the control unit 6 performs unsharp mask processing as an example of the high-frequency component extraction processing.

Figure 10:
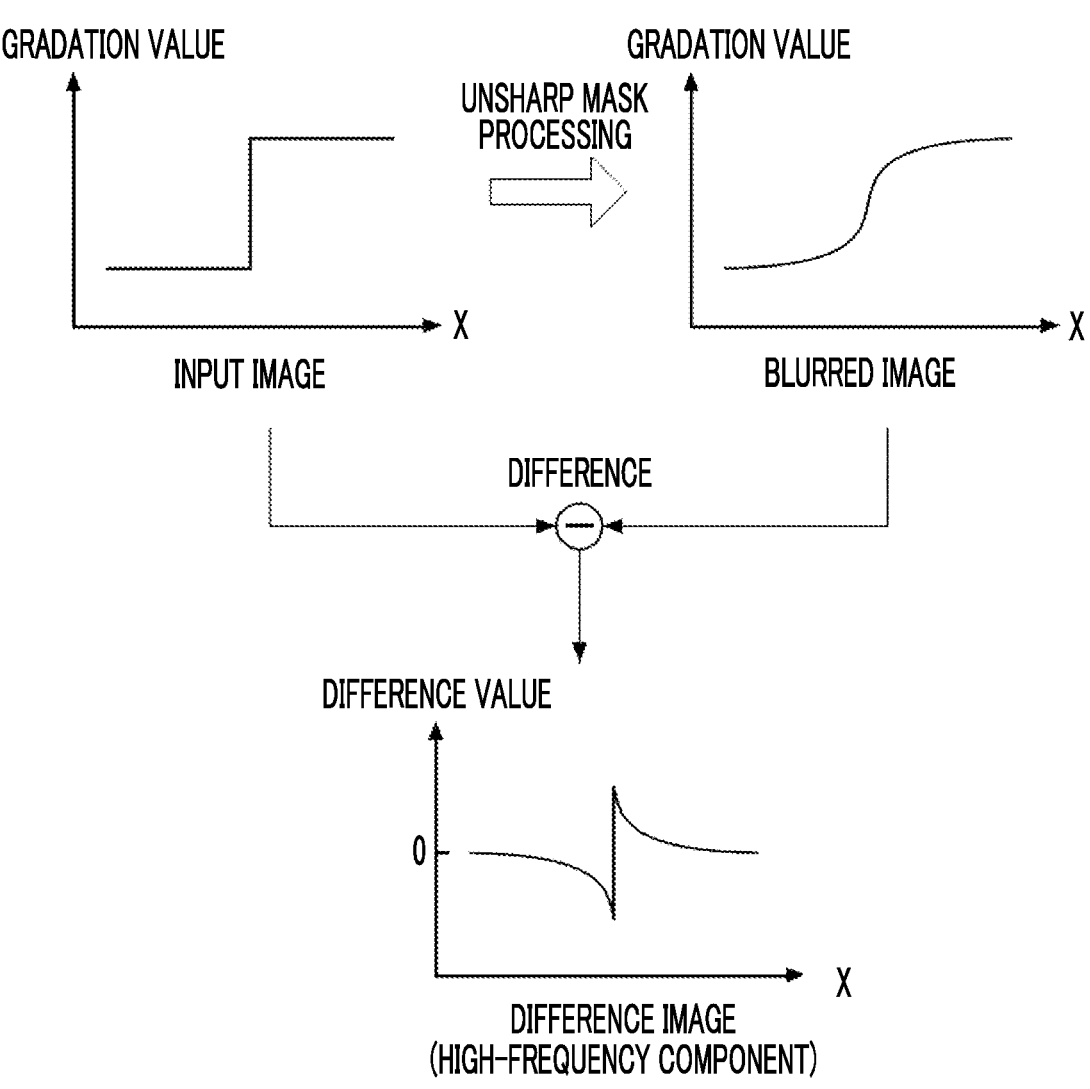
FIG. 10 is a view illustrating high-frequency component extraction processing.

Specifically, as shown in FIG. 10, the control unit 6 first multiplies the input image by an unsharp mask (also called a kernel) to generate a blurred image (also called an unsharp image). The size of the unsharp mask is, for example, 5×5 pixels.

The control unit 6 uses, for example, a Gaussian filter represented by the following Expression (1) as the unsharp mask.

$$f(x, y) = \frac{1}{2\pi\sigma^2} e^{-\frac{x^2+y^2}{2\sigma^2}} \tag{1}$$

Here, x and y represent the coordinates of pixels. f(x,y) is the filter coefficient. σ is the standard deviation representing the degree of distribution. In the present embodiment, the standard deviation σ is represented by the number of pixels. Note that the standard deviation σ corresponds to the radius of blurring of the input image.

Then, as shown in FIG. 10, the control unit 6 subtracts the blurred image from the input image (that is, obtains the difference) to generate a difference image representing the high-frequency components of the input image. The difference image has a large difference value at a portion corresponding to a portion (that is, edge portion) having a large gradation difference (that is, density difference) in the input image.

Figures 11, 12:
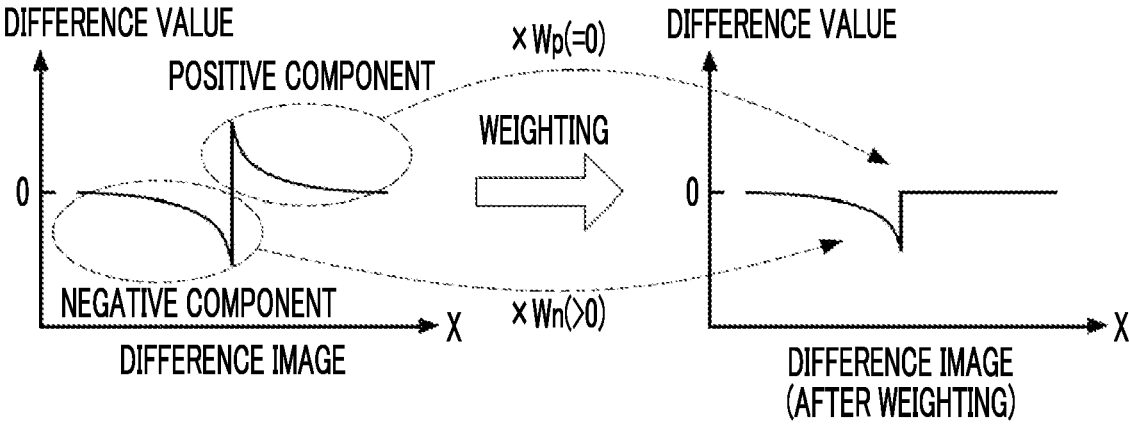
FIG. 11 is a view illustrating weighting processing.
FIG. 12 is a view illustrating superimposition processing.

Next, in Step S11, the control unit 6 performs weighting processing for weighting the high-frequency components extracted in Step S10. As shown in FIG. 11, the control unit 6 weights positive components greater than zero and negative components less than zero in the difference image, respectively. Specifically, the control unit 6 multiplies the positive component of the difference image by a weight Wp, and multiplies the negative component of the difference image by a weight Wn. In the present embodiment, Wp=0 and Wn>0. That is, in the present embodiment, the weighted difference image is an image obtained by extracting only the negative component from the original difference image and weighting the extracted negative component. The value of the weight Wn can be set optionally. The weight Wn is, for example, 0.7.

Next, in Step S12, superimposition processing is performed to superimpose the high-frequency components on the input image. Specifically, as shown in FIG. 12, the control unit 6 adds the weighted difference image to the input image to generate a display image on which high-frequency components are superimposed. Since the weighted difference image added to the display image has only negative components, the display image is an image in which only the dark portion among density differences of the high-frequency components of the input image is emphasized. The range to be emphasized in the emphasis processing corresponds to the standard deviation $\sigma$ of the Gaussian filter.

In a case where the resolution of the image display device 3 is D (unit: ppi), in the unsharp mask processing applied to the input image, it is preferable to set the range for emphasizing the dark portion to a range according to a value M (unit: the number of pixels) obtained by the following Expression (2). More specifically, the standard deviation $\sigma$ of the Gaussian filter is set to a value M or less.

$$M = 30/(2.54 \times 1000/D) \qquad (2)$$

In a case where D=249, M≈2.94. Therefore, in a case where the image display device 3 has a general resolution of 249 ppi, it is preferable to set the standard deviation $\sigma$ to 2.94 or less. Note that in a case where the standard deviation $\sigma$ of the Gaussian filter is set to a value M, a range wider than the value M is emphasized.

[Effect]

Figure 13:
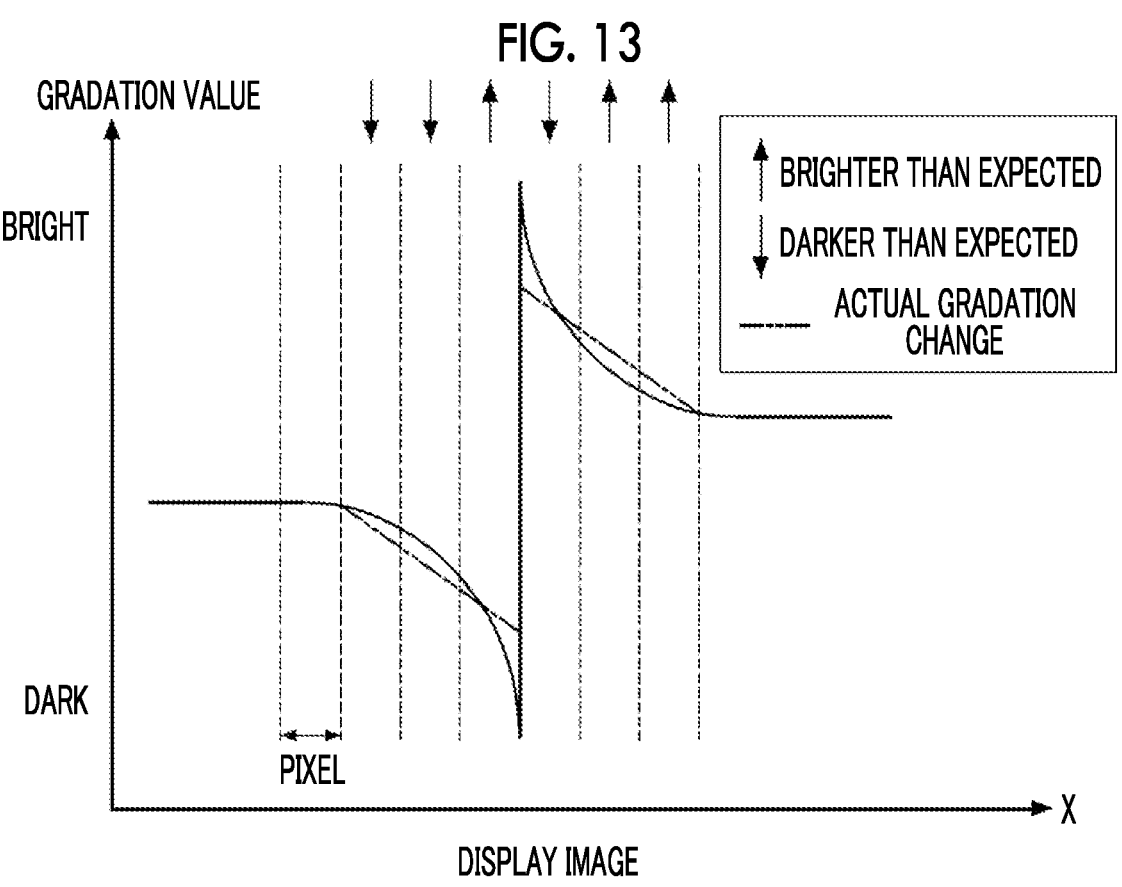
FIG. 13 is a view illustrating the effects of the image exposure device according to the first embodiment.

Next, an effect of the image exposure device 2 according to the present embodiment will be described. FIG. 13 shows an example of a display image obtained by emphasizing a bright portion and a dark portion in emphasis processing for emphasizing density differences of high-frequency components of an input image as in the related art. In FIG. 13, two-dot dashed lines show an example of actual gradation change of a recorded image assumed in a case where a display image in the related art is displayed on the image display device 3.

As shown in FIG. 6, since the pixel 30 is an aggregate of the point light sources 30A and the light emitted from the point light sources 30A is diffused light, the light passing through the light transmission part 51 of the limiting member 5 is diffused. This diffusion may extend to the outside (peripheral portion) of a pixel region to be irradiated on the photosensitive recording medium 7. In a case where diffused light spreads to the peripheral portion, the peripheral portion of a pixel region with bright irradiation brightness becomes brighter than expected, and conversely, the pixel region becomes darker than expected. In this way, the periphery of the bright portion becomes brighter, and conversely, the bright portion becomes darker, thereby canceling the effect of emphasizing the brightness and darkness. As a result, the gradation change of the recorded image becomes gentle as a whole.

Therefore, even though the weight for emphasizing the density difference of the high-frequency components of the input image is increased, the effect of emphasizing the brightness and darkness is canceled. In this manner, in a case where a display image in the related art is displayed on the image display device 3, there is a likelihood that a phenomenon such as "the sense of resolution is not improved" may occur. Furthermore, in a case where the display image is a color image, there is a likelihood that a phenomenon such as "the color change in the peripheral portion becomes large" may occur.

On the other hand, in the present embodiment, the display image obtained by emphasizing only the dark portion in the process of emphasizing the density difference of the high-frequency components of the input image is displayed on the image display device 3. Therefore, the degree to which the effect of emphasizing the brightness and darkness is canceled is reduced, and the change in brightness and darkness in the peripheral portion is reduced. Thus, according to the present embodiment, the sense of resolution can be improved. Furthermore, in a case where the display image is a color image, it is possible to reduce the color change in the peripheral portion.

Furthermore, by reducing the standard deviation $\sigma$ of the Gaussian filter corresponding to the range to be emphasized in the emphasis processing, it is possible to reduce the peripheral region affected by the emphasized pixels. Accordingly, it is possible to further improve the sense of resolution and further reduce the color change in the peripheral portion.

Figure 14:
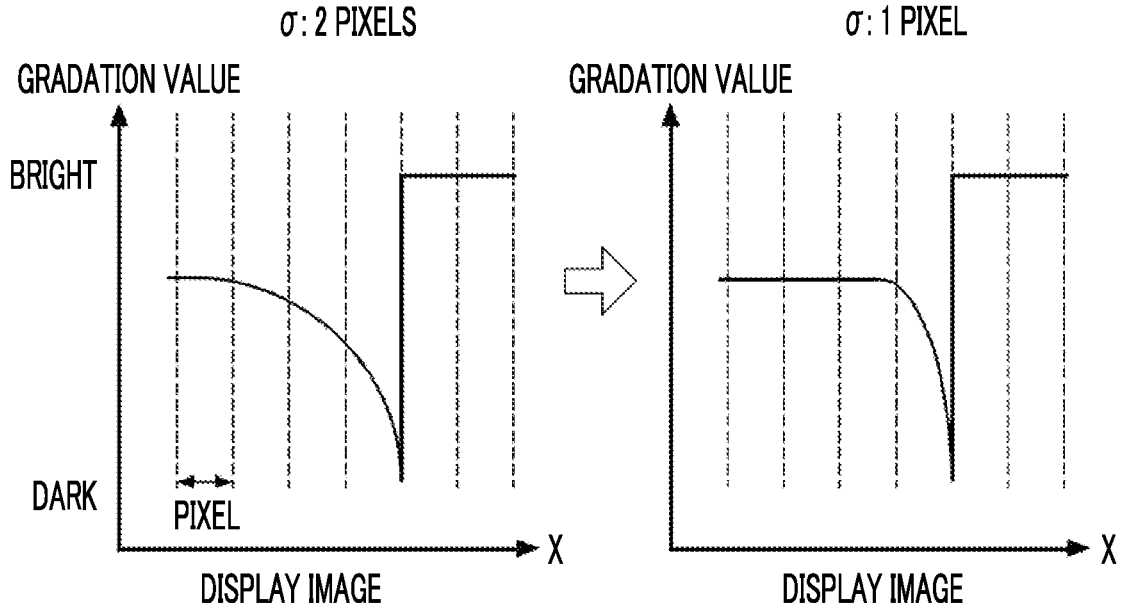
FIG. 14 is a view showing an example of changes in a display image caused by changing the standard deviation.

FIG. 14 is a view showing an example of changes in a display image caused by changing the standard deviation $\sigma$. The smaller the standard deviation $\sigma$, the smaller the dark portion region that is emphasized by the emphasis processing, and the smaller the peripheral region that is affected by the emphasized pixels.

First Modification Example

Next, a first modification example of the first embodiment will be described. In the first embodiment, the image exposure device 2 uses the limiting member 5 having a single-layer configuration, but in the first modification example, a limiting member having a two-layer configuration is used.

Figure 15A:
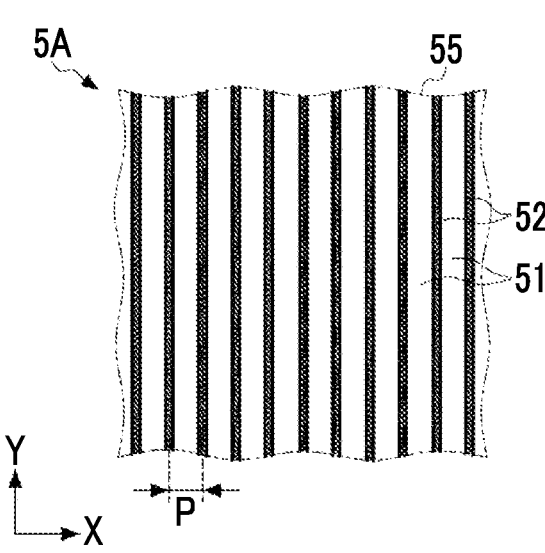
FIG. 15A is a plan view showing a configuration of a first layer of a limiting member according to a first modification example.
Figure 15B:
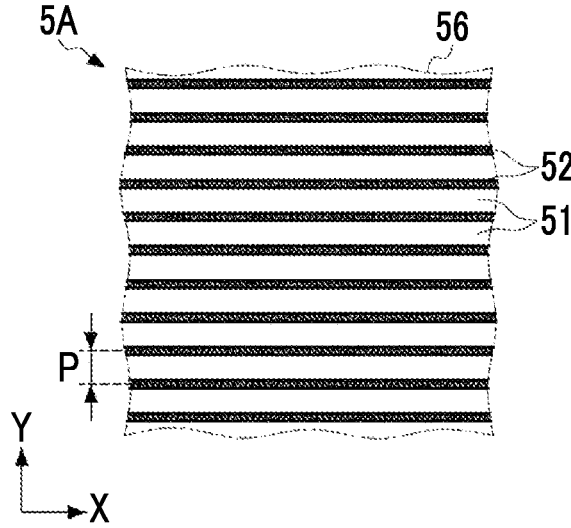
FIG. 15B is a plan view showing a configuration of a second layer of the limiting member according to the first modification example.
Figure 15C:
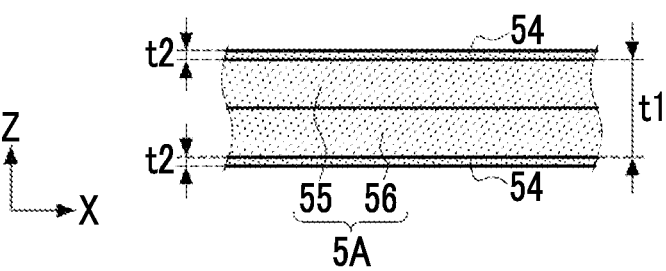
FIG. 15C is a side view showing the configuration of the limiting member according to the first modification example.

FIGS. 15A to 15C show examples of another configuration of the limiting member. FIG. 15A is a plan view showing a configuration of a first layer 55 of a limiting member 5A according to the first modification example. FIG. 15B is a plan view showing a configuration of a second layer 56 of the limiting member 5A according to the first modification example. FIG. 15C is a side view showing the configuration of the limiting member 5A according to the first modification example.

As shown in FIG. 15C, the limiting member 5A is formed by laminating the first layer 55 and the second layer 56. As shown in FIG. 15A, in the first layer 55, the light transmission parts 51 and the light shielding parts 52 are alternately disposed only in the first direction (corresponding to the X direction). As shown in FIG. 15B, in the second layer 56, the light transmission parts 51 and the light shielding parts 52 are alternately disposed only in the second direction (corresponding to the Y direction) perpendicular to the first direction.

Thus, the limiting member 5A has a two-layer configuration of the first layer 55 and the second layer 56. The limiting member 5A having a two-layer configuration has the same effect as the limiting member 5 (see FIGS. 5A and 5B) composed of one layer.

The pitch P of the light shielding parts 52 is preferably 80 μm or less and more preferably 65 μm or less, as in the first embodiment. Also, in order to suppress the occurrence of moire fringe, it is preferable that the angles formed by the arrangement direction of the light transmission parts 51 and the light shielding parts 52 and the X direction and the Y direction are preferably in the range of 1 to 45 degrees, and more preferably in the range of 5 to 40 degrees.

As shown in FIG. 15C, a thickness t1 of the limiting member 5A is the sum of the thickness of the first layer 55 and the thickness of the second layer 56. As in the first embodiment, the thickness t1 of the limiting member 5A is preferably 1.5 mm or more and 4.0 mm or less, more preferably 2.0 mm or more and 4.0 mm or less, and even more preferably 2.5 mm or more and 4.0 mm or less.

In addition, a protective layer 54 may be formed on each of the upper surface which is a surface of the first layer 55 on the image display device 3 side and the lower surface which is a surface of the second layer 56 on the photosensitive recording medium 7 side. A thickness t2 of the protective layer 54 is preferably 0.1 μm or more and 500 μm or less as in the first embodiment.

Second Modification Example

Next, a second modification example of the first embodiment will be described. In the first embodiment, only the dark portion is emphasized in the process of emphasizing the density difference of the high-frequency components of the input image, but in the second modification example, the bright portion is emphasized in addition to the dark portion. Note that the degree of emphasis of the dark portion is made higher than the degree of emphasis of the bright portion.

Figure 16:
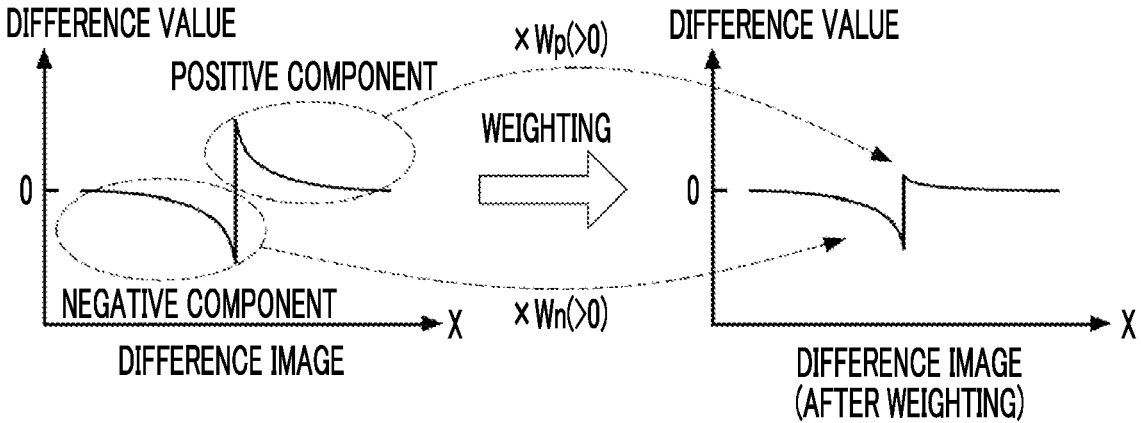
FIG. 16 is a view illustrating weighting processing according to a second modification example.

Specifically, in the first embodiment, in the weighting processing of the difference image, the control unit 6 sets the weight Wp for the positive component of the difference image to 0, as shown in FIG. 11. In the present modification example, as shown in FIG. 16, the control unit 6 sets the weight Wp for the positive component of the difference image to a value greater than 0 and smaller than the weight Wn for the negative component of the difference image (that is, 0<Wp<Wn) to weight the difference image.

Figure 17:
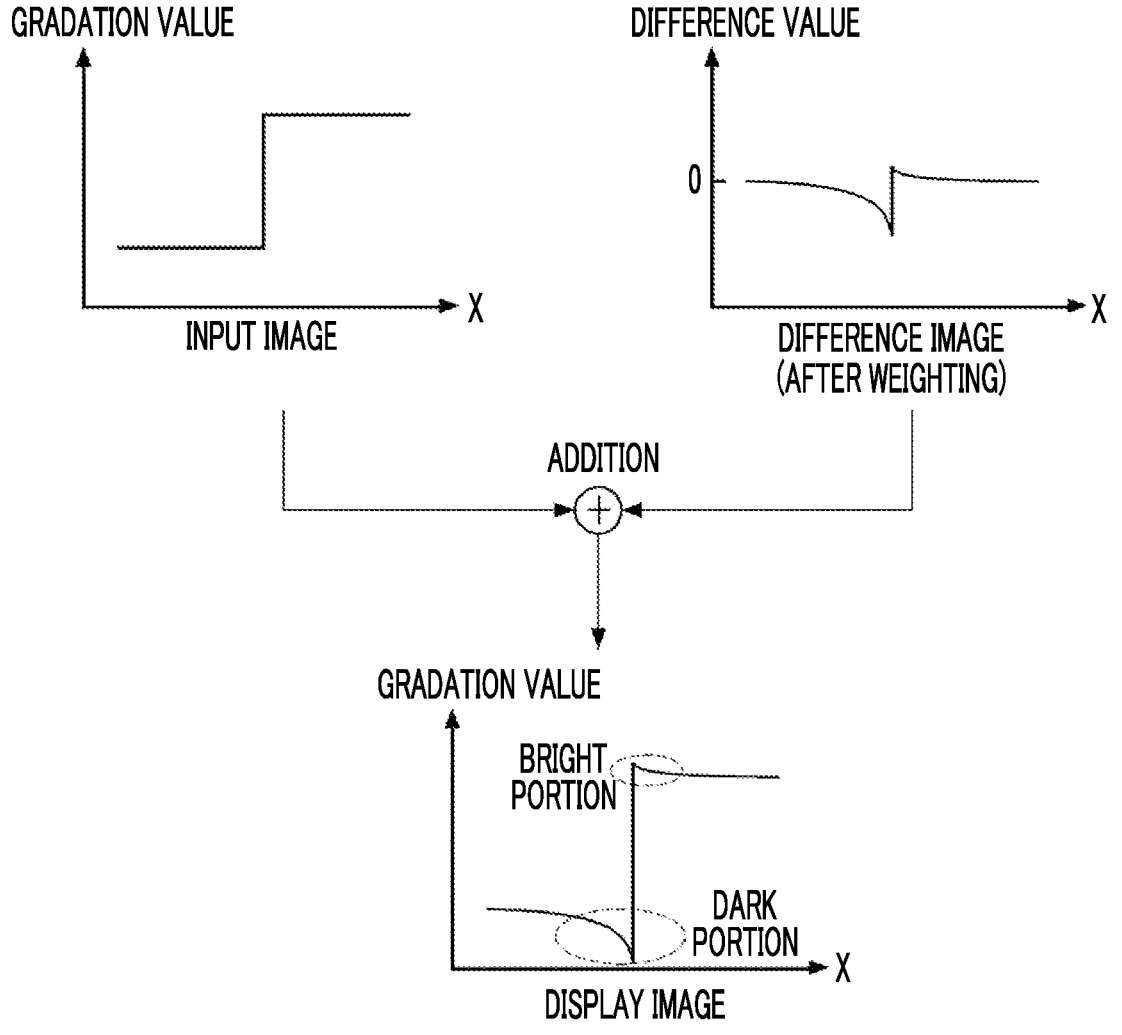
FIG. 17 is a view illustrating superimposition processing according to the second modification example.

In a case where the difference image weighted in this way is superimposed on the input image, as shown in FIG. 17, in the display image, among the density differences of the high-frequency components of the input image, the bright portion is emphasized, and the dark portion is emphasized with a higher degree of emphasis than the bright portion. In the present modification example, since the degree of emphasis of the dark portion is higher than the degree of emphasis of the bright portion, the same effect as in the first embodiment can be obtained.

[Effect Experiment of Image Exposure Device]

Next, an experimental result performed on the effect of the image exposure device 2 according to the technology of the present disclosure will be shown.

(Experiment 1)

In this experiment, a general liquid crystal display device having a resolution of 249 ppi was used as the image display device 3. Moreover, the material of the support member 4 was a metal plate. As the photosensitive recording medium 7, an Instax film was used.

In addition, in this experiment, the limiting member 5A having a two-layer configuration (see FIGS. 15A to 15C) shown as the first modification example was used. In the first layer 55, the width of the light transmission part 51 in the first direction was set to 45 μm, and the width of the light shielding part 52 was set to 15 μm. That is, the pitch P of the light shielding parts 52 in the first direction was set to 60 μm. Further, in the second layer 56, the width of the light transmission part 51 in the second direction was set to 45 μm, and the width of the light shielding part 52 was set to 15 μm. That is, the pitch P of the light shielding parts 52 in the second direction was set to 60 μm.

Also, by setting the thicknesses of the first layer 55 and the second layer 56 to 1.25 mm, respectively, the thickness t1 of the limiting member 5A was set to 2.5 mm. Also, the thickness t2 of the protective layer 54 was set to 0.2 μm. Also, in order to suppress the occurrence of moire fringes, the angle formed by the arrangement direction of the light transmission parts 51 and the light shielding parts 52 and the X direction and the Y direction was set to 8 degrees. Furthermore, the distance L (see FIG. 4) from the limiting member 5A to the exposure surface 7A of the photosensitive recording medium 7 was set to 0.5 mm.

In addition, as the input image, a general photographic image in which a landscape or a person was a subject was used.

In order to confirm the effect of the image exposure device 2, display images obtained by performing emphasis processing on the input image based on the following three emphasis conditions were displayed on the image display device 3, and the photosensitive recording medium 7 was exposed.

First emphasis condition: No emphasis (Wp=0, Wn=0)

Second emphasis condition: Emphasis of bright portion and dark portion (Wp=0.5, Wn=0.5)

Third emphasis condition: Emphasis of only dark portion (Wp=0, Wn=0.5)

The first emphasis condition means that high-frequency components of the input image are not emphasized, that is, the input image is used as the display image.

The second emphasis condition means using a display image obtained by emphasizing the bright portion and the dark portion in emphasis processing for emphasizing density differences of high-frequency components of the input image as in the related art. The weight Wp corresponding to the degree of emphasis of the bright portion and the weight Wn corresponding to the degree of emphasis of the dark portion are the same.

The third emphasis condition means using a display image obtained by emphasizing only the dark portion in emphasis processing for emphasizing density differences of high-frequency components of the input image. In the third emphasis condition, the weight Wp corresponding to the degree of emphasis of the bright portion is set to 0.

In addition, in the second emphasis condition and emphasis processing using the third emphasis condition, unsharp mask processing was performed with the standard deviation σ of the Gaussian filter set to 2 pixels.

As the evaluation method, a sensory evaluation was used in which an expert in the evaluation of the sense of resolution of a photograph visually evaluated the sense of resolution of the recorded image recorded on the photosensitive recording medium 7. Specifically, an evaluation was made as to whether or not the recorded image obtained under the second emphasis condition and the third emphasis condition had reduced blurring, had good visibility, and was a desirable image compared to the recorded image obtained under the first emphasis condition.

Regarding the sense of resolution, an evaluation result was obtained that the third emphasis condition was the best compared to the first emphasis condition, and the second emphasis condition was the next best. In other words, it has been confirmed that, in a case where only the dark portion is emphasized in the process of emphasizing the density difference of the high-frequency components of the input image as in the technology of the present disclosure, the sense of resolution is improved.

(Experiment 2)

Next, as Experiment 2, an experiment was conducted on the dependence of the standard deviation $\sigma$ corresponding to the range to be emphasized. In this experiment, display images obtained by performing emphasis processing on the input image based on the following two emphasis conditions were displayed on the image display device 3, and the photosensitive recording medium 7 was exposed. Other conditions of Experiment 2 are the same as those of Experiment 1.

Fourth emphasis condition: Standard deviation $\sigma$ of 3 pixels, emphasis of only dark portion (Wp=0, Wn=0.5)

Fifth emphasis condition: Standard deviation $\sigma$ of 1 pixel, emphasis of only dark portion (Wp=0, Wn=0.5)

The fourth emphasis condition and the fifth emphasis condition differ from the third emphasis condition only in the value of the standard deviation $\sigma$. In the fourth emphasis condition, the standard deviation $\sigma$ is 3 pixels. In the fifth emphasis condition, the standard deviation $\sigma$ is 1 pixel.

In Experiment 2, the same method as in Experiment 1 was used to evaluate the recorded image. As a result, regarding the sense of resolution, an evaluation result was obtained that the recorded image obtained under the fifth emphasis condition had better sense of resolution than the recorded image obtained under the fourth emphasis condition. That is, it was confirmed that the sense of resolution was improved by reducing the standard deviation $\sigma$.

Next, the same evaluation as above was performed in a case where the weight Wn corresponding to the degree of emphasis of the dark portion and the standard deviation $\sigma$ corresponding to the range to be emphasized were changed. Table 1 below shows the evaluation results. Note that the sense of resolution was determined according to three stages of A to C. "A" represents that the sense of resolution is the best. "C" represents that the sense of resolution is the worst.

TABLE 1

| | | $\sigma$ (Number of pixels) | | |
| --- | --- | --- | --- | --- |
| | | 1 | 2 | 3 |
| Wn | 0.6 | A | B | C |
| | 0.7 | A | B | C |
| | 0.8 | A | B | C |

As shown in Table 1, it was confirmed that the sense of resolution was improved by reducing the standard deviation $\sigma$ regardless of the value of the weight Wn.

In the first embodiment and each modification example, the example in which the unsharp mask processing is performed as the emphasis processing performed by the control unit 6 has been described, but the present disclosure is not limited to the unsharp mask processing, and for example, convolution processing or the like may be applied.

Further, the configuration of the limiting member is not limited to the configuration shown in the first embodiment and the first modification example, and any member capable of limiting the angle of light emitted from the image display device 3 may be used. For example, in the first embodiment and the first modification example, in the first direction and the second direction in which the light transmission parts 51 and the light shielding parts 52 are arranged, the second direction is perpendicular to the first direction, but the second direction may not be parallel to the first direction. Also, the light transmission parts 51 and the light shielding parts 52 may be disposed aperiodically. For example, a randomly perforated capillary plate or the like can be used as the limiting member.

Further, although the image display device 3 is a display such as a liquid crystal display device in the first embodiment and each modification example, it is also possible to apply a mobile terminal such as a smartphone or a tablet terminal as the image display device 3. In this case, the control unit 6 is built in the image display device 3. For example, a CPU of a smartphone or the like executes the image processing program 65 to function as the control unit 6 and perform image processing. The image display device 3 receives image data on which image processing has been performed from the smartphone, and causes the image display surface 31 to display a display image corresponding to the image data.

In the above embodiment, the following various processors can be used as the hardware structure of the control unit 6. The various processors described above include a CPU that is a general-purpose processor that functions by executing software (program) and a processor such as a field-programmable gate array (FPGA) whose circuit configuration can be changed after manufacturing. FPGA includes a programmable logic device (PLD), a dedicated electrical circuit that is a processor having a circuit configuration designed exclusively for executing specific processing such as an application specific integrated circuit (ASIC), or the like. Image processing may be executed by one of the various processors or may be executed by a combination of two or more processors of the same type or different types (for example, a combination of a plurality of FPGAs or a combination of a CPU and an FPGA). Furthermore, a hardware structure of the various processors is, more specifically, an electrical circuit in which circuit elements such as semiconductor elements are combined.

In each of the above-described embodiments, the image processing program 65 is described as being stored (installed) in the storage unit 62 in advance; however, the present disclosure is not limited thereto. The image processing program 65 may be provided in a form recorded in a non-transitory recording medium such as a compact disk read only memory (CD-ROM), a digital versatile disk read only memory (DVD-ROM), or a universal serial bus (USB) memory. In addition, the image processing program 65 may be downloaded from an external device via a network.

What is claimed is:

1. An image exposure device comprising:

an image display device that has a plurality of pixels and irradiates a photosensitive recording medium with light from the plurality of pixels;

a support member that supports the photosensitive recording medium in a state in which an exposure surface of the photosensitive recording medium faces the image display device;

a limiting member that is provided between the image display device and the support member and limits an angle of the light emitted from the image display device to the photosensitive recording medium; and a processor, wherein the processor is configured to control the image display device to display a display image generated by emphasizing a dark portion among density differences of high-frequency components of an input image, and wherein in a case where a resolution (unit: ppi) of the image display device is D, the processor is configured to set a range for emphasizing the dark portion to a range according to a value M (unit: the number of pixels) obtained by a relational expression M=30/(2.54×1000/D).

2. The image exposure device according to claim 1, wherein the processor is configured to generate the display image by emphasizing a bright portion in addition to the dark portion among the density differences of the high-frequency components of the input image, and a degree of emphasis of the dark portion is higher than a degree of emphasis of the bright portion.

3. The image exposure device according to claim 1, wherein the processor is configured to emphasize the density differences of the high-frequency components extracted from the input image by unsharp mask processing.

4. The image exposure device according to claim 1, wherein the processor is configured to set a standard deviation of a Gaussian filter to the value M or less, and extracts the high-frequency component by performing unsharp mask processing using the Gaussian filter from the input image.

5. The image exposure device according to claim 1, wherein the limiting member is an optical member of a diffusion optical system.

6. The image exposure device according to claim 5, wherein the optical member is a louver film in which first light transmission parts that transmit light and first light shielding parts that block light are alternately disposed in a first direction on a surface parallel to an arrangement surface where the pixels of the image display device are arranged, and second light transmission parts that transmit light and second light shielding parts that block light are alternately disposed in a second direction on the surface, the second direction being not parallel to the first direction.

7. The image exposure device according to claim 5, wherein the optical member is a louver film in which first light transmission parts that transmit light and first light shielding parts that block light are alternately disposed in a first direction on a surface parallel to an arrangement surface where the pixels of the image display device are arranged, and second light transmission parts that transmit light and second light shielding parts that block light are alternately disposed in a second direction on the surface, the second direction being perpendicular to the first direction.

8. The image exposure device according to claim 6, wherein the louver film is formed by laminating a first layer in which the first light transmission parts and the first light shielding parts are alternately disposed only in the first direction, and a second layer in which the second light transmission parts and the second light shielding parts are alternately disposed only in the second direction.

9. The image exposure device according to claim 6, wherein the louver film has a thickness of 2.0 mm or more and 4.0 mm or less, and an arrangement pitch of the first light shielding parts and the second light shielding parts is 80 μm or less.

10. The image exposure device according to claim 1, wherein the limiting member is disposed at a position separated by a certain distance from the photosensitive recording medium.

11. The image exposure device according to claim 10, wherein the certain distance is 0.67 mm or less.

12. An image exposure method in an image exposure device, the method comprising:

providing the image exposure device which includes:

an image display device that has a plurality of pixels and irradiates a photosensitive recording medium with light from the plurality of pixels, a support member that supports the photosensitive recording medium in a state in which an exposure surface of the photosensitive recording medium faces the image display device, a limiting member that is provided between the image display device and the support member and limits an angle of the light emitted from the image display device to the photosensitive recording medium, and a processor; and controlling, by the processor, the image display device to display a display image generated by emphasizing a dark portion among density differences of high-frequency components of an input image, wherein in a case where a resolution (unit: ppi) of the image display device is D, the processor is configured to set a range for emphasizing the dark portion to a range according to a value M (unit: the number of pixels) obtained by a relational expression M=30/(2.54×1000/D).

13. A non-transitory computer-readable storage medium storing a program for causing a computer having a processor to execute a process of an image exposure in an image exposure device which includes:

an image display device that has a plurality of pixels and irradiates a photosensitive recording medium with light from the plurality of pixels;

a support member that supports the photosensitive recording medium in a state in which an exposure surface of the photosensitive recording medium faces the image display device;

a limiting member that is provided between the image display device and the support member and limits an angle of the light emitted from the image display device to the photosensitive recording medium; and the processor, and the process includes:

controlling, by the processor, the image display device to display a display image generated by emphasizing a dark portion among density differences of high-frequency components of an input image, wherein in a case where a resolution (unit: ppi) of the image display device is D, the processor is configured to set a range for emphasizing the dark portion to a range according to a value M (unit: the number of pixels) obtained by a relational expression M=30/(2.54×1000/D).

* * * * *